Feb. 20, 1951  J. R. LONGSTREET  2,542,419
MACHINE TOOL
Filed March 30, 1945  6 Sheets-Sheet 1

FIG. 1

INVENTOR.
JAMES R. LONGSTREET
BY
Kwis Hudson Boughton & Williams
ATTORNEYS

Feb. 20, 1951   J. R. LONGSTREET   2,542,419
MACHINE TOOL
Filed March 30, 1945   6 Sheets-Sheet 2

INVENTOR.
JAMES R. LONGSTREET
BY
Kwis Hudson Boughton & Williams
ATTORNEYS

Feb. 20, 1951  J. R. LONGSTREET  2,542,419
MACHINE TOOL

Filed March 30, 1945  6 Sheets-Sheet 4

INVENTOR.
JAMES R. LONGSTREET
BY
Kwis Hudson Boughton & Williams
ATTORNEYS

Feb. 20, 1951     J. R. LONGSTREET     2,542,419

MACHINE TOOL

Filed March 30, 1945     6 Sheets-Sheet 5

INVENTOR.
JAMES R. LONGSTREET
BY
Kwis Hudson Boughton & Williams
ATTORNEYS

Patented Feb. 20, 1951

2,542,419

UNITED STATES PATENT OFFICE 2,542,419

MACHINE TOOL

James R. Longstreet, Bedford, Ohio, assignor to The Warner & Swasey Company, Cleveland, Ohio, a corporation of Ohio Application March 30, 1945, Serial No. 585,717

4 Claims. (Cl. 308—3.5)

This invention relates to a machine tool and more particularly to guard or cover means for the entire top of the bed, as for instance guard or cover means for the front and rear ways and the closed top of the bed intermediate the ways.

In machine tools such as lathes or the like the ways should be protected against chips, dirt and other foreign matter lodging thereon and which when mixed with the lubricant for the ways forms an abrasive compound with resultant serious wear on the working or contacting surfaces of the ways and the member or members sliding thereon. The wear necessitates from time to time the resurfacing of the contacting surfaces of the ways and sliding members, particularly of the ways, in order to remove the effects of the wear and to keep the machine accurate. This is not only expensive and reduces the life of the machine but results in an economic loss due to the fact that the machine is of necessity out of commission while thus being repaired. Furthermore, the remachining of the surfaces requires a realignment of the sliding members with relation to the work holding spindle. In fact the difficulties of restoring the machine to a proper working condition after it has been adversely affected by wear are so great that it is often necessary to ship the machines to the factory to be reconditioned.

Difficulty also is experienced due to chips and other foreign matter dropping onto the closed top of the bed intermediate the ways and collecting on the closed top until removed by the operator. The removal of the chips and foreign matter from the closed top of the bed intermediate the ways is often difficult and time consuming as is also the cleaning of the ways and the necessary relubrication thereof.

An object of the invention is to include in a machine tool having a closed top bed provided with front and rear ways, improved and novel means for completely guarding, covering and protecting the surfaces of the ways and the surface of the top of the bed intermediate the ways from the lodgment thereon of chips, dirt and other foreign matter and thus facilitating the disposal of the chips, dirt or foreign matter from the ways and the top of the bed to the rear of the bed.

Another object is to include in combination with a machine tool having a closed top bed provided with a front way and a lowered rear way improved and novel rearwardly inclined means guarding, covering and protecting the surfaces of the ways and the upper surface of the bed intermediate the ways from the lodgment thereon of chips, dirt and other foreign matter and which means facilitates the disposal and removal of chips, dirt and foreign matter from the inclined means downwardly and rearwardly beyond the rear of the bed.

Another object is to provide in a machine tool improved and novel means, such as referred to in the last named object and which means being inclined toward the rear of the bed causes the coolant dripping thereon from the cutting tools and the work piece to move across the guard means toward the rear side of the bed.

A further object is to provide in a machine tool having a bed with front and rear ways, improved and novel means for retaining the lubricant on the ways and for protecting the surfaces of the ways against injury from the falling or the placing thereon of heavy tools or other objects.

Another object is to include in a machine tool having a bed provided with a front way and a lowered rear way, improved means for guarding and protecting the surfaces of the ways and the upper surface of the bed intermediate the ways and including an arrangement functioning to drain off coolant or other liquid dripping from the tools and which may seep through or between the guard means into the space intermediate the ways.

Further and additional objects and advantages residing in the invention and not hereinbefore referred to will become apparent during the detailed description of several embodiments of the invention which is to follow.

Referring to the accompanying drawings.

Although the invention is shown herein as embodied in a turret lathe it will be understood that such showing is not by way of limitation but merely for illustration purposes and that the invention may be embodied in various other forms of machine tools.

Figure 1:
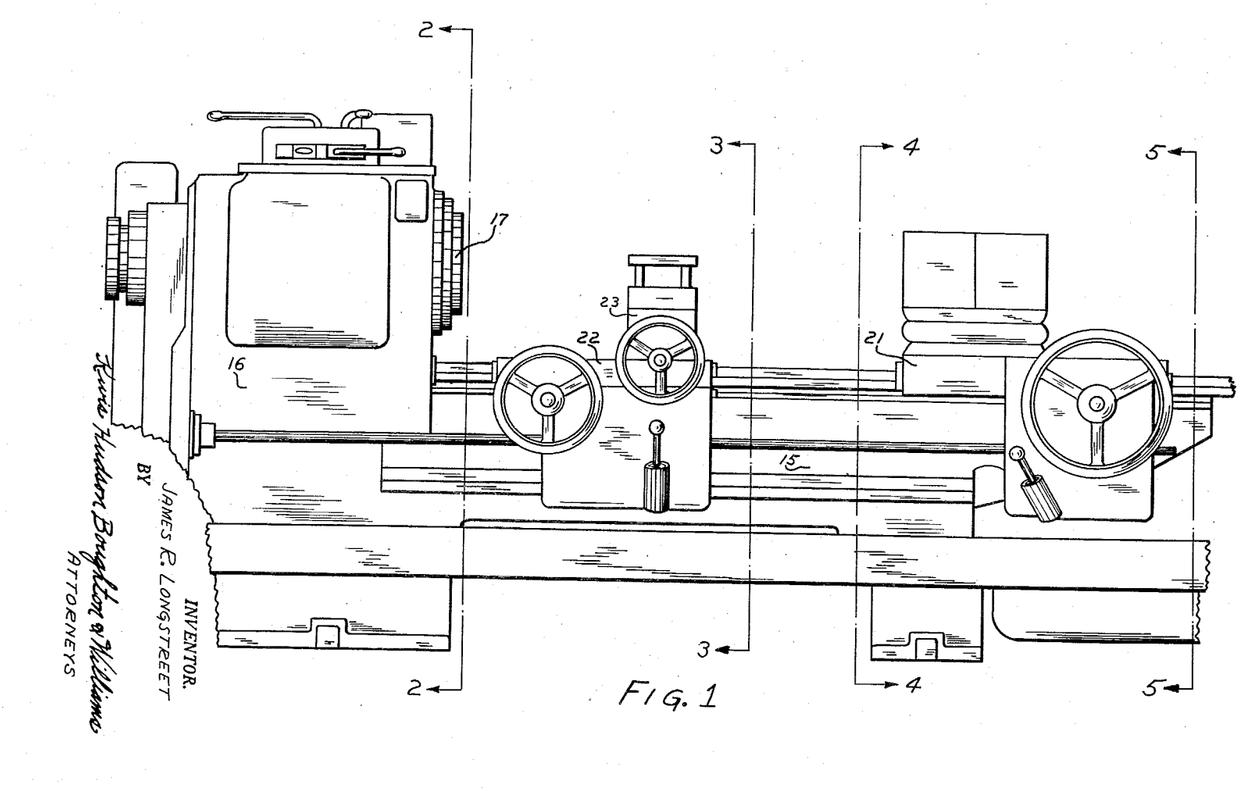
Fig. 1 is a front elevational view of a machine tool embodying the invention in one of its forms; the machine tool shown for purposes of illustration being a turret lathe.

The machine tool shown in Figs. 1 to 5 inclusive comprises a bed 15 and a headstock 16 provided with the usual work spindle, the nose 17 of which is clearly shown in Fig. 1. The bed 15 is provided with a front way 18 and a rear way 19 which is located at a lower level than the front way. The ways 18 and 19 are shown in this instance as of substantially inverted V-shape, while the bed 15 intermediate the ways is closed at the top and is formed with a rearwardly and downwardly extending portion 20 interconnecting the front and rear ways. A turret slide 21 is slidably carried by both the front and rear ways for movement therealong toward and away from the headstock 16. A cross slide carriage 22 having a cross slide 23 thereon is located intermediate the head 16 and the turret slide 21 and in this instance the cross slide carriage 22 is shown as of the type supported by both the front and rear ways. The turret slide 21 and the cross slide carriage 22 are provided in this instance on their undersides with inverted substantially V-shaped grooves which closely interfit and slide along the front and rear ways 18 and 19. The turret slide 21 and the cross slide carriage 22 are held against upward movement relative to the ways by means of suitable gibs or holding elements 24 as will be well understood in the art.

Figures 2, 2A:
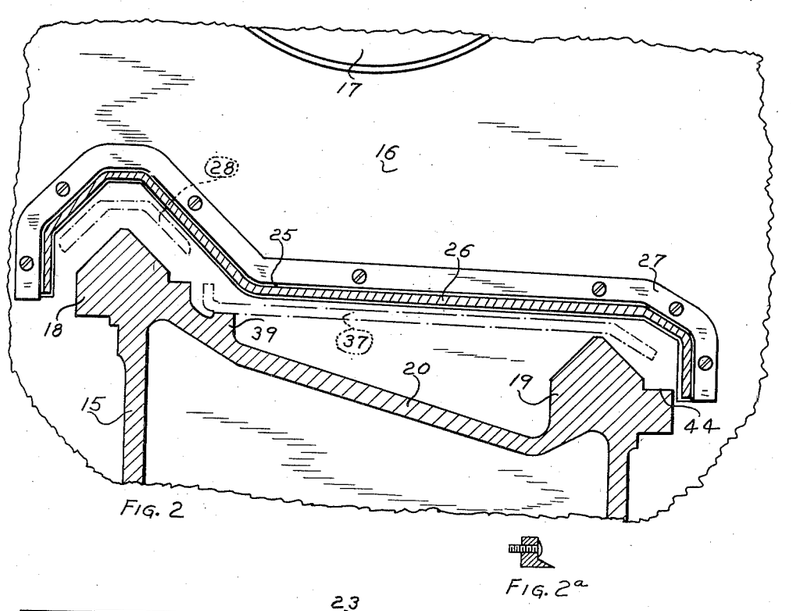
Fig. 2 is a vertical transverse sectional view through the bed of the machine tool shown in Fig. 1 and is taken looking toward the headstock of the machine tool and substantially along line 2—2 of Fig. 1.
Fig. 2a is a detail sectional view of the wiper employed to wipe the moving guard members.

Means embodying the invention and completely guarding or protecting the front way 18 and the rear way 19 and the upper surface of the bed intermediate said ways and attaining the objects hereinbefore referred to will now be described. Referring first to Fig 2, it will be seen that the end of the headstock 16 below the nose 17 of the spindle is provided with a slot 25 extending generally transversely of the headstock and shaped to movably receive a guard plate 26 which is secured to the side of the cross slide carriage that is adjacent to the headstock, i. e., the left hand side of the cross slide carriage as viewed in the drawings. The guard plate 26 is illustrated in the form of an integral plate and has a portion which is spaced from but shaped to embrace and protect the front way 18, an intermediate portion overlying the bed between the ways and inclined downwardly and rearwardly and a rear portion overlying and extending downwardly of the rear side of the rear way 19. The guard plate 26 will thus be seen as adequately covering and protecting the front and rear ways and the upper surface of the bed intermediate said ways from the lodgment thereon of chips, dirt and foreign matter between the cross slide carriage and the headstock.

As previously stated, the guard plate 26 is secured to the left side of the cross slide carriage and said plate moves with the movement of the carriage and is of such length as to extend into the opening 25 in the headstock during all operative movements of the carriage, that is the plate 26 is of sufficient length to provide for maximum movement of the cross slide carriage. The headstock 16 has fixed to its end above the slot 25 a wiper member 27 the shape of which conforms closely to the contour of the plate and which acts to prevent chips, dirt and foreign matter on the guard plate 26 from working through the opening 25 and into the interior of the headstock.

Figure 3:
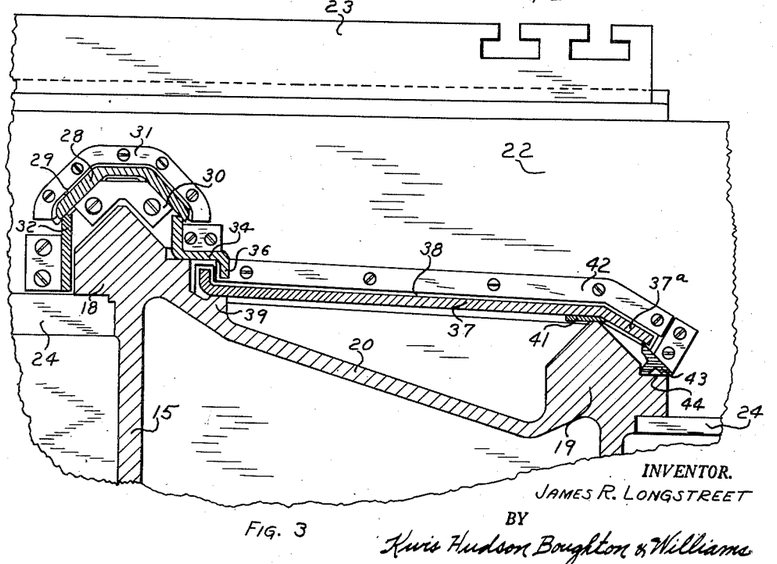
Fig. 3 is a vertical transverse sectional view through the bed of the machine tool and is taken intermediate the turret slide and the cross slide carriage and looking toward the latter along line 3—3 of Fig. 1.
Figure 4:
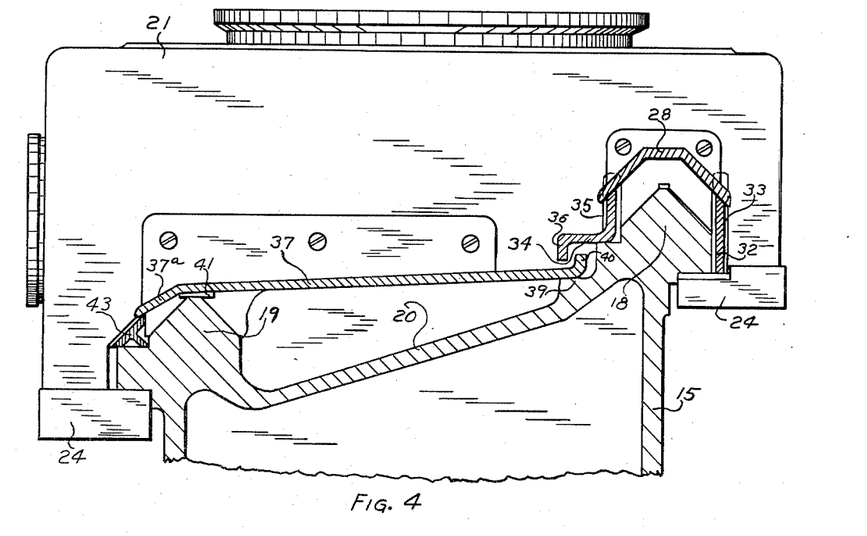
Fig. 4 is a vertical transverse sectional view through the bed taken intermediate the turret slide and the cross slide carriage along line 4—4 of Fig. 1 and looking toward the turret slide.

Referring to Fig. 3 which is taken looking at the cross slide carriage from the right and to Fig. 4 which is taken looking toward the turret slide from the left, it will be seen that a guard member 28 is secured to the left side of the turret slide 21 and extends over the front way 18 and through an opening 29 formed in the cross slide carriage 22 and in certain relative positions of the turret slide and cross slide carriage will have its free end underlying the guard plate 26, as indicated in Fig. 2. The cross slide carriage 22 has secured to its right hand side below the opening 29 a supporting plate 30 and on which the divergent legs of the guard member 28 are slidably supported. It will be understood that the guard member 28 moves with the turret slide and is of such length as to always cover the front way 18 intermediate the turret slide and the cross slide carriage. In order to prevent chips, dirt or foreign matter which may have lodged on the guard member from working through the opening 29 and into the cross slide carriage 22 a wiper member 31 is secured to the cross slide carriage above the opening 29

Referring to Fig. 3 it will be seen that a vertically extending guard member 32 is secured to the cross slide carriage and projects toward the turret slide 21 and in front of the front way 18. The upper end of the guard member 32 underlies the front edge of the guard member 28 and said guard member 32 projects into a vertical slot 33 in the turret slide 21 (see Fig. 5). The cross slide carriage 22 has secured to its right hand side and at the rear of the front way 18 an angularly shaped guard member 34 which underlies the rear edge of the guard member 28 and projects toward the turret slide 21 and through a slot 35 formed in the turret slide (see Figs. 3 and 4). The general arrangement of the guard members 28, 32 and 34 is substantially the same as the guard members for the front way in the Burrell and Van Hamersveld Reissue Patent No. 16,534, January 11, 1927 and said guard members function to completely enclose and protect the front way at all times. The angular shaped guard member 34 along its rear edge is provided with a downwardly extending flange portion 36, the purpose of which will later be explained.

Referring to Fig. 4, it will be seen that the turret slide 21 has secured to its left hand end a guard plate 37 which projects from the turret slide toward and through a slot 38 in the cross slide carriage 22, see Fig. 3. In certain relative positions of the turret slide and cross slide carriage the guard plate 37 will extend entirely through the carriage and underlie the guard plate 26, as indicated by dot and dash lines in Fig. 2. The guard plate 37 is shown as slidably supported adjacent the front edge of the guard plate by a longitudinally extending supporting rib or other suitable means 39 formed on the upper side of the portion 20 of the bed 15 and adjacent the rear of the front way 18. The front edge of the guard plate 37 has an upturned flange 40 which extends in front of the flange portion 36 of the angular guard member 34; in other words, the flanges 36 and 40 of the guard member 34 and the guard plate 37 overlap and obviate the likelihood of chips working between said guard member and said guard plate. The guard plate 37 is downwardly and rearwardly inclined and overlies the rear way 19 and is slidably supported on said rear way by a wear strip 41 secured to the underside of the guard plate 37. The guard plate 37 along its rear edge has an angularly and downwardly disposed portion 37a which overlies the rear inclined surface of the rear way 19. The cross slide carriage 22 on its right hand side and above the slot 38 is provided with a wiper 42 to prevent chips, dirt and other foreign matter which may be on the upper surface of the guard plate 37 from working through the opening 38 and into the cross slide carriage.

The cross slide carriage 22 on its right hand side and adjacent the rear thereof has secured to it a T-shaped bar 43, see Fig. 3, which projects longitudinally of the bed toward and through the turret slide 21, see Fig. 4. The cross arm of the T-shaped bar 43 underlies and supports the angular portion 37a of the guard plate 37 and said bar is supported by the shoulder 44 extending longitudinally of the rear of the bed at the lower end of the rear inclined surface of the rear way 19.

In order to indicate clearly the relationship between the guard plate 26 carried by the cross slide carriage and projecting through the slot 25 into the headstock and the guard member 28 for the front way and the guard plate 37 said guard member 28 and guard plate 37 have been indicated by dot and dash lines in Fig. 2 solely for the purpose of showing their relationship to the guard plate 26, it being understood that said guard member and guard plate 37 do not actually appear in Fig. 2.

Figure 5:
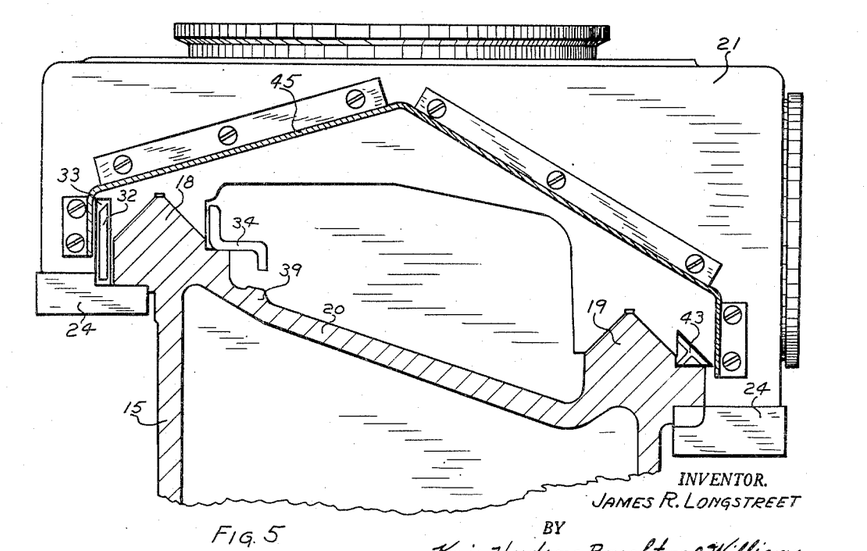
Fig. 5 is a vertical transverse sectional view through the bed taken to the right of the turret slide and looking toward the latter along line 5—5 of Fig. 1.

Referring to Fig. 5 it will be seen that the right hand side of the turret slide 21 has secured to it a guard plate 45 which projects from the turret slide 21 and toward the right hand end of the bed. The guard plate 45 has downwardly divergent portions at the lower edges of which are vertically extending portions and said guard plate is of such width that it extends upwardly from in front of the front way 18 rearwardly of the bed and downwardly and rearwardly of the rear way 19, thus fully protecting said ways and the upper surface of the bed intermediate the ways from the lodgment thereon of chips, dirt and other foreign matter which may drop from the tools carried by the turret.

From the foregoing description it will have been seen that the ways 18 and 19 and the top portion 20 of the bed intermediate the ways are completely covered and protected by the guard members described and which are secured to the slides and are so arranged as to always be in an operative position irrespective of the extent of the various movements of the slides. Further it will have been noted that the guard members and guard plates not only protect the surfaces of the ways and the upper surface of the bed intermediate the ways from the lodgment thereon of chips, dirt and other foreign matter, but that said guard members are so disposed as to facilitate the disposition of the chips, dirt and foreign matter to the rear of the bed, and in case coolant is used on the tools, to enable the coolant which may drop from the tools carried by the turret to move over the guard members to the rear of the bed. The complete and adequate protection afforded by the guard members and guard plates decrease wear on the ways and slides and therefore increase the life of the machine and reduce the necessity for remachining the contacting surfaces of the ways and slides to eliminate any inaccuracies which may have been produced by wear of said surfaces.

In Figs. 6 to 10 inclusive there is disclosed a turret lathe differing somewhat in construction from the turret lathe shown in Fig. 1. Also Figs. 6 to 10 inclusive disclose a way guard construction embodying the invention but differing in form from the embodiment of the invention disclosed in Figs. 1 to 5 inclusive.

The turret lathe shown in Figs. 6 to 10 inclusive comprises a bed 46 which is closed at the top between the ways and the headstock 47 which rotatably supports a work spindle, the nose of which is indicated at 48. The bed 46 is provided with a front way 49 and a lowered rear way 50, with both ways of substantially inverted V-shape. The front way 49 is extended along the front side of the headstock 47, as clearly indicated in Figs. 6 and 7. A turret slide 51 is slidably supported by both the front and rear ways, while a cross slide carriage 52 in this instance is slidably supported by only the front way 49. The cross slide carriage 52 is also supported by means of an auxiliary way extending along the front side of the bed and with which auxiliary way the apron 53 of the cross slide carriage cooperates as is well understood in the art and which is clearly disclosed in the Burrell and Van Hamersveld Reissue Patent No. 16,534, January 11, 1927.

Figure 6:
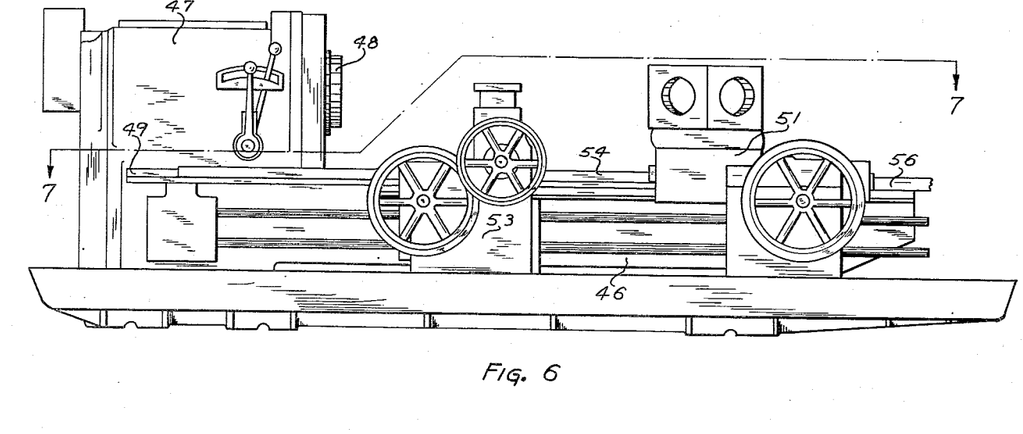
Fig. 6 is a front elevational view of a somewhat different turret lathe than is shown in Fig. 1 and which different lathe embodies a modified form of the invention from that illustrated in the preceding views.
Figure 7:
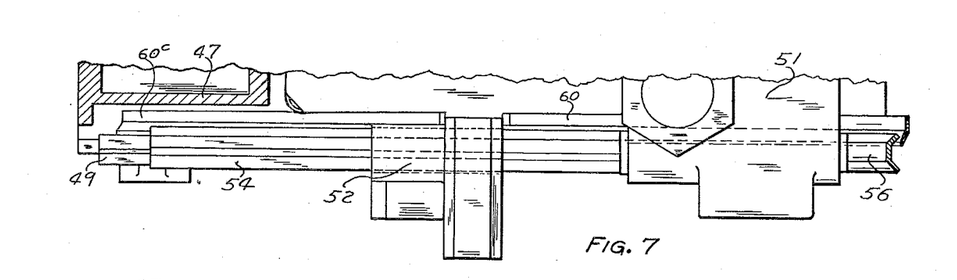
Fig. 7 is a fragmentary horizontal sectional and plan view of the turret lathe shown in Fig. 6 and is taken substantially along line 7—7 of Fig. 6 looking in the direction of the arrows, the rear way being omitted.

An inverted V-shaped guard 54 for the front way 49 is secured to the turret slide 51 and on the side thereof adjacent to the headstock, i. e., the left hand side as viewed in Figs. 6 and 7, and said way guard 54 overlies the front way 49 and extends through an opening 55 formed in the cross slide carriage 52. The way guard 54 moves with the turret slide 51 and is of such length that it extends over the front way 49 and alongside the front of the headstock 47 and provides protection for the front way 49 between the headstock and the turret slide during maximum movements of the slide. The turret slide 51 on the side thereof remote from the headstock 47, i. e., the right hand side as viewed in Figs. 6 and 7, has secured to it an inverted V-shaped guard member 56 which projects toward the right over the front way 49 and moves with the turret slide, said guard member being of sufficient length to cover the way while the turret slide is in its most forward position. The bed 46 is provided intermediate the ways 49 and 50 with a rearwardly and downwardly inclined top portion 57 interconnecting the ways and having adjacent the rear side of the front way 49 a pair of longitudinally extending stepped shoulders 58 and 59. An angle strip 60 is supported by the shoulder 58 and is secured to the right side of the cross slide. An angle strip 60c is similarly supported by the shoulder 58 and is secured to the left side of the cross slide. The angle strip 60 and the angle strip 60c have their rear edges overlying the shoulder 59, while their front edges are provided with an upwardly extending arm 60a that underlies the rear edges of the guard members 54 and 56 as clearly shown in Figs. 9 and 10. It will be understood that the angle strip 60 and the angle strip 60c moves with the cross slide carriage 52 and that the turret slide 51 can move relative to said strips, since the under surfaces of said slide are shaped to accommodate the strip.

A guard plate 61 is fixed to and extends longitudinally of the bed and has its front edge engaging and supported by the shoulder 59 and underlying the rear edge of the angle strip 60 and the angle strip 60c. The guard plate 61 is downwardly and rearwardly inclined and is supported adjacent its rear edge by a plurality of longitudinally spaced supporting posts or ribs 62 which engage the upper side of the top portion 57 of the bed 46. The guard plate 61 adjacent its rear and lower edge is provided on its underside with a longitudinally extending groove or channel 63. The turret slide 51 adjacent its right hand side as viewed in the drawings has secured to it a supporting bracket 64 which is attached to a guard member 65 that extends toward the headstock and is slidably supported by the rear inclined and vertical sides of the rear way 50. The guard member 65 extends through a slot 66 formed in the end of the headstock and a suitable wiper element may be provided adjacent said slot 66 to prevent any chips, dirt or foreign matter carried by the guard member 65 from working into the interior of the headstock. The upper and front edge of the guard member 65 is provided with an upturned longitudinally extending flange 67 which projects into the channel 63 on the underside of the guard plate 61 and thus said guard plate 61 and guard member 65 are overlapped so as to eliminate the possibility of chips and other foreign matter working between said guard plate and said guard member.

A strip 68 is secured to the bracket 64 and to the underside of the guard member 65 and projects toward the headstock. The strip 68 has mounted in it several rollers 69 contacting the front inclined side of the rear way 50 and rolling therealong when the guard member 65 and strip 68 move with the turret slide 51. The turret slide 51 adjacent its right hand side as viewed in Figs. 6 and 7 and its left hand side as viewed in Fig. 8, has secured to it a supporting bracket 70 to which is attached a guard member 71 similar to the guard member 65 and projecting over the rear way 50 toward the end of the bed. The guard member 71 is slidably supported on the rear inclined and vertical sides of the rear way 50 and is provided at its front edge with an upstanding flange 72 extending into the channel 63 of the guard plate 61.

Figures 8, 9, 10:
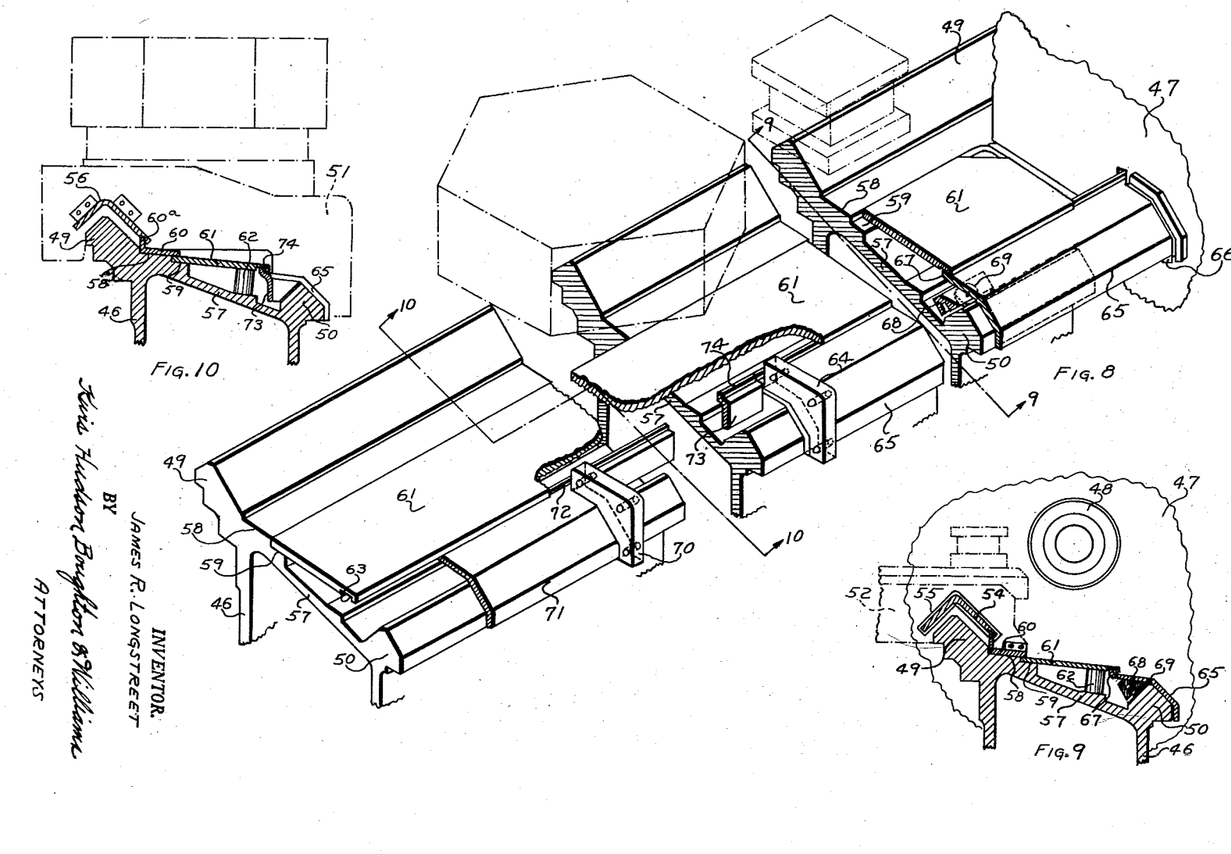
Fig. 8 is a rear perspective view of the bed of the machine shown in Figs. 6 and 7, with the hexagon turret of the turret slide and the square turret of the cross slide indicated by dot and dash lines.
Fig. 9 is a vertical transverse sectional view through the bed and is taken along line 9—9 of Fig. 8 looking in the direction of the arrows, the cross slide carriage and cross slide being indicated by dot and dash lines as mounted on the front way.
Fig. 10 is a vertical transverse sectional view through the bed and is taken along line 10—10 of Fig. 8, looking in the direction of the arrows, with the turret slide shown by dot and dash lines as mounted on the front and rear ways of the bed.

Extending between the supporting brackets 64 and 70 and attached to the turret slide and movable therewith is a vertically arranged longitudinally extending guard strip 73 which adjacent its upper edge is offset toward the front of the bed and then extends upwardly into the channel 63 as indicated at 74 (see Fig. 8).

From the foregoing it will be seen that not only the front way 49 is completely covered and protected but also the rear way 50 and the top of the bed intermediate the front and rear ways are covered or guarded against the lodgment thereon of chips, dirt and other foreign matter.

The guard members 65 and 71 for the rear way move with the turret slide and have an overlapping relationship with the guard plate 61, wherefore chips and dirt and other foreign matter are excluded from working into the space intermediate the ways. The guard members 65 and 71 are adequately supported by the rear way and their front upwardly flanged edges which extend into the channel 63 of the guard plate assist in supporting said plate as does also the upper edge 74 of the strip 73.

The rollers 69 carried by the strip 68 provide an ambulatory support for the guard member on the front inclined surface of the rear way 50. It will be understood that similar roller supports could be provided for the guard member 71 if desired.

Figures 11, 12:
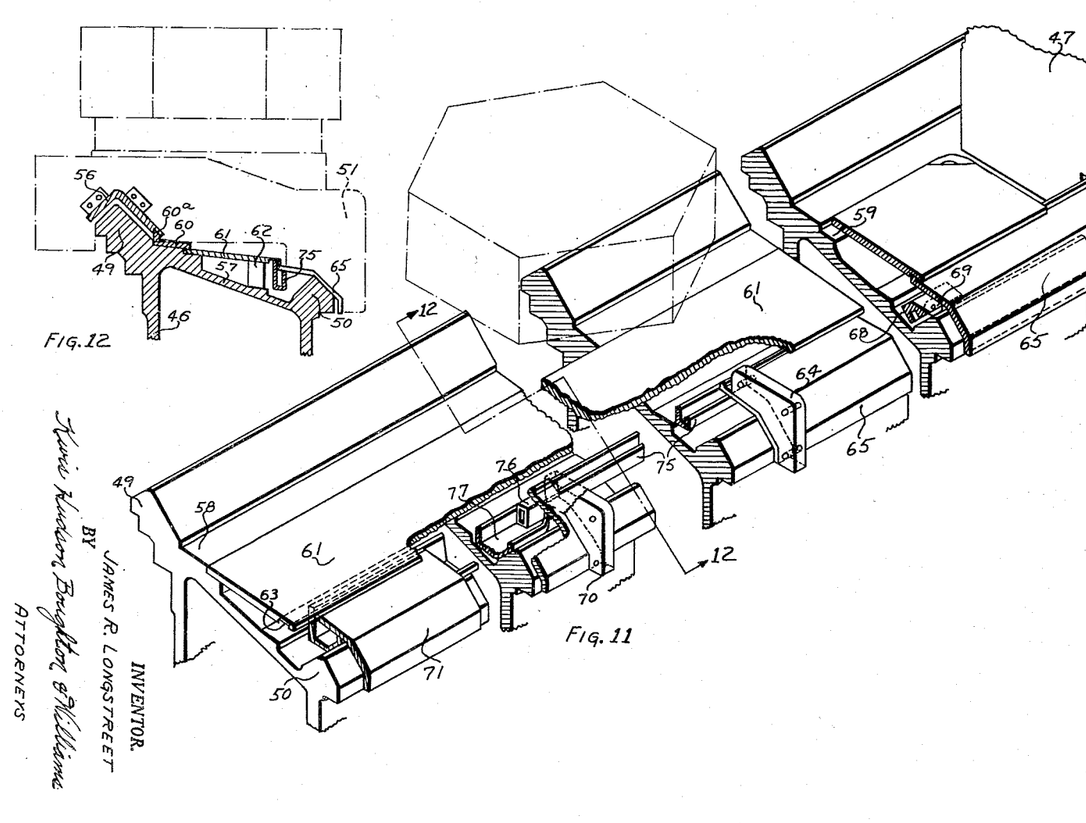
Fig. 11 is a view similar to Fig. 8 but illustrates a further modified form of construction embodying the present invention.
Fig. 12 is a vertical transverse sectional view taken along line 12—12 of Fig. 11, looking in the direction of the arrows, and with the turret slide indicated by dot and dash lines.

In Figs. 11 and 12 there is disclosed a construction of slightly different form than the construction shown in Figs. 8 to 10 inclusive, but insofar as the two constructions are identical the same reference characters are employed in Figs. 11 and 12 and the description as to the identical parts need not be repeated. In Figs. 11 and 12 the strip 73 shown in Fig. 8 is replaced by an upwardly facing channel 75 carried by the brackets 64 and 70 and moving with the turret slide. The channel 75 has its front leg longer than its rear leg and said front leg extends into the groove 63 on the underside of the guard plate 61. The rear leg of the channel 75 underlies at its right hand end the left hand end of the guard member 65. The channel 75 at its left hand end as viewed in Fig. 11 is of reduced dimension to extend beneath the bracket 70 and under the guard member 71, the portion of the channel 75 which is of reduced dimension being tubular in form and indicated at 76 in Fig. 11. The tubular portion 76 extends into a channel 77 supported by the top portion 57 of the bed and having its rear wall rearwardly inclined to contact the front inclined surface of the rear way 50 and then extending vertically upwardly to underlie and engage the undersurface of the guard member 71.

The front wall of the channel 77 extends vertically and underlies and is connected to the underside of the guard member 71 and adjacent the front edge thereof. The channel 77, channel 75 and guard member 71 move unitarily with the turret slide. The channel 77 is of such length that it will project beyond the end of the bed even when the turret slide is in its most right hand operative position as viewed in Fig. 11. It will be seen that any coolant which may drop from the tools on the turret which gets beneath the turret slide and onto the guard plate 76 together with chips or dirt which may be included with such coolant will be cascaded toward the rear edge of the guard plate 61 and into the channel 75 from whence it will move toward the end of the turret slide through said channel 75, and the tubular portion 76 thereof and then it will drain into the channel 77 which carries it to the end of the bed.

From the foregoing description of several embodiments of the invention it will have been seen that the objects enumerated at the beginning hereof as well as other objects and advantages referred to or becoming apparent during the detailed description are adequately and effectively attained by said constructions embodying the invention.

Although several embodiments have been illustrated and described herein it will also be understood that the invention is susceptible of various other modifications and adaptations within the scope of the appended claims.

Having thus described my invention, I claim:

1. In a machine tool having a closed top bed provided with longitudinally extending front and rear ways, a headstock at one end of said ways, first and second slides movable on said ways and respectively adjacent to and remote from said headstock, said slides being provided with openings, said first slide having secured thereto side guard members extending along the front and rear sides of said front way and projecting through openings in said second slide, said second slide having secured thereto a top guard member overlying said front way and the side guard members adjacent thereto and projecting through an opening in said first slide; the improvement which comprises having said headstock provided with a slot, a single rearwardly declining rigid guard member secured to said first slide and extending into said slot and having portions overlying and protecting said ways and the closed top of said bed, said first slide having secured thereto a rigid side guard member extending along the rear side of said rear way and projecting through an opening in said second silde, said second slide having secured thereto a rearwardly declining rigid guard plate projecting through an opening in said first slide with its opposite edges and the side guard members at the rear sides of both ways arranged in overlapping relationship, said second slide having secured thereto a rigid cover guard plate extending in a direction away from said headstock and overlying said front and rear ways and said closed top bed.

2. The improvement defined in claim 1 and wherein said headstock has secured thereto above said slot a wiper coextensive with said slot and contacting said single rearwardly declining guard member.

3. The improvement defined in claim 1 and wherein said single rearwardly declining guard member has a portion spaced above said front way and shaped complementally thereto, an intermediate portion overlying the closed top bed between the ways and inclined downwardly and rearwardly toward the rear way and a rear portion overlying the rear way and extending downwardly of the rear side thereof.

4. The improvement defined in claim 1 and wherein said rearwardly declining guard plate secured to said second slide has supporting sliding engagement with said bed, said rear way, and said side guard member adjacent the rear side of said rear way.

JAMES R. LONGSTREET.

REFERENCES CITED

The following references are of record in the file of this patent:

UNITED STATES PATENTS

| Number | Name | Date |
|---|---|---|
| Re. 16,534 | Burrell et al. | Jan. 11, 1927 |
| 446,148 | Landis | Feb. 10, 1891 |
| 2,417,672 | Armitage | Mar. 18, 1947 |
| 2,430,827 | Rougemont | Nov. 11, 1947 |